US008258394B2

(12) United States Patent  (10) Patent No.: US 8,258,394 B2
Baruh  (45) Date of Patent: Sep. 4, 2012

(54) RETRACTABLE SOLAR PANEL SYSTEM

(76) Inventor: Bradford G Baruh, Hillsborough, CA (US)

( * ) Notice: Subject to any disclaimer, the term of this patent is extended or adjusted under 35 U.S.C. 154(b) by 1234 days.

(21) Appl. No.: 11/821,315

(22) Filed: Jun. 22, 2007

(65) Prior Publication Data
US 2008/0190476 A1  Aug. 14, 2008

(51) Int. Cl.
H01L 31/045 (2006.01)
(52) U.S. Cl. ........................................................ 136/245
(58) Field of Classification Search .................. 136/245
See application file for complete search history.

(56) References Cited

U.S. PATENT DOCUMENTS

| | | | |
|---|---|---|---|
| 1,856,803 A | 5/1932 | Blackman | |
| 3,173,395 A | 3/1965 | Laurent | |
| 3,408,973 A | 11/1968 | Curtis et al. | |
| 3,867,894 A | 2/1975 | Vicard | |
| 4,013,031 A | 3/1977 | Viviano | |
| 4,263,861 A | 4/1981 | Vicard | |
| 4,355,630 A | 10/1982 | Fattor | |
| 4,626,852 A | 12/1986 | Dodge | |
| 4,658,599 A | 4/1987 | Kajiwara | |
| 6,189,471 B1 | 2/2001 | Mitchell et al. | |
| 6,526,901 B2 | 3/2003 | Iacoboni | |
| 6,953,000 B2 * | 10/2005 | Fink | 114/102.1 |
| 7,102,074 B2 | 9/2006 | Yen et al. | |
| 7,150,153 B2 | 12/2006 | Browe | |
| 7,201,431 B1 | 4/2007 | Calandruccio | |
| 7,252,083 B2 | 8/2007 | Hayden | |
| 2004/0173255 A1 * | 9/2004 | Heckeroth | 136/245 |
| 2005/0252432 A1 * | 11/2005 | Pamula | 114/90 |

FOREIGN PATENT DOCUMENTS

DE 19614152 A1 10/1996
JP 403145168 A 10/1989

OTHER PUBLICATIONS

Written Opinion dated Oct. 9, 2008 issued in International Application No. PCT/US2008/053185.
International Search Report issued in PCT/US2008/053185 dated Oct. 9, 2008.

* cited by examiner

*Primary Examiner* — Jennifer Michener
*Assistant Examiner* — Dustin Q Dam
(74) *Attorney, Agent, or Firm* — Buchanan Ingersoll & Rooney PC

(57) ABSTRACT

A retractable solar panel system, which includes a plurality of solar panels, and a system for extending and retracting the plurality of solar panels. The plurality of solar panels can be configured to be attachable to a nautical stay, wherein the stay is fixed at one end to a hull of the sailboat and at a second end to a mast of the sailboat.

18 Claims, 14 Drawing Sheets

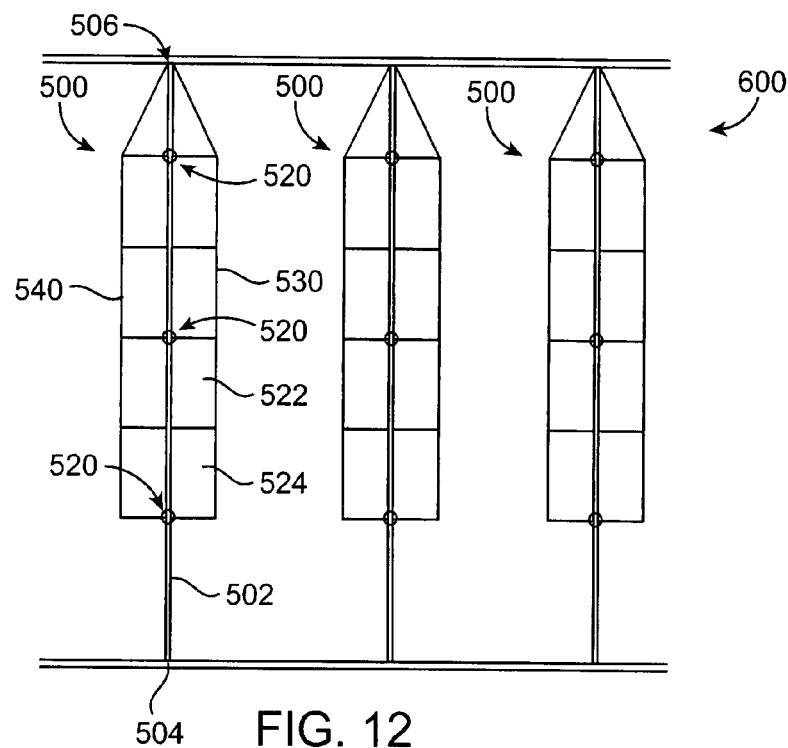
FIG. 12
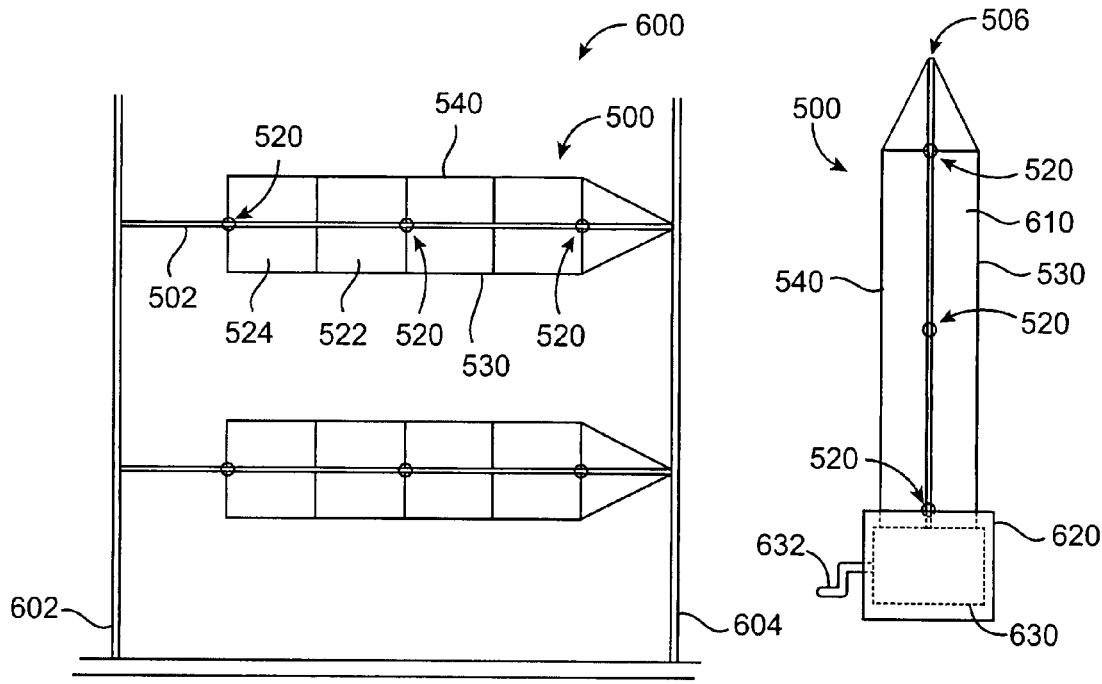
FIG. 13
FIG. 14

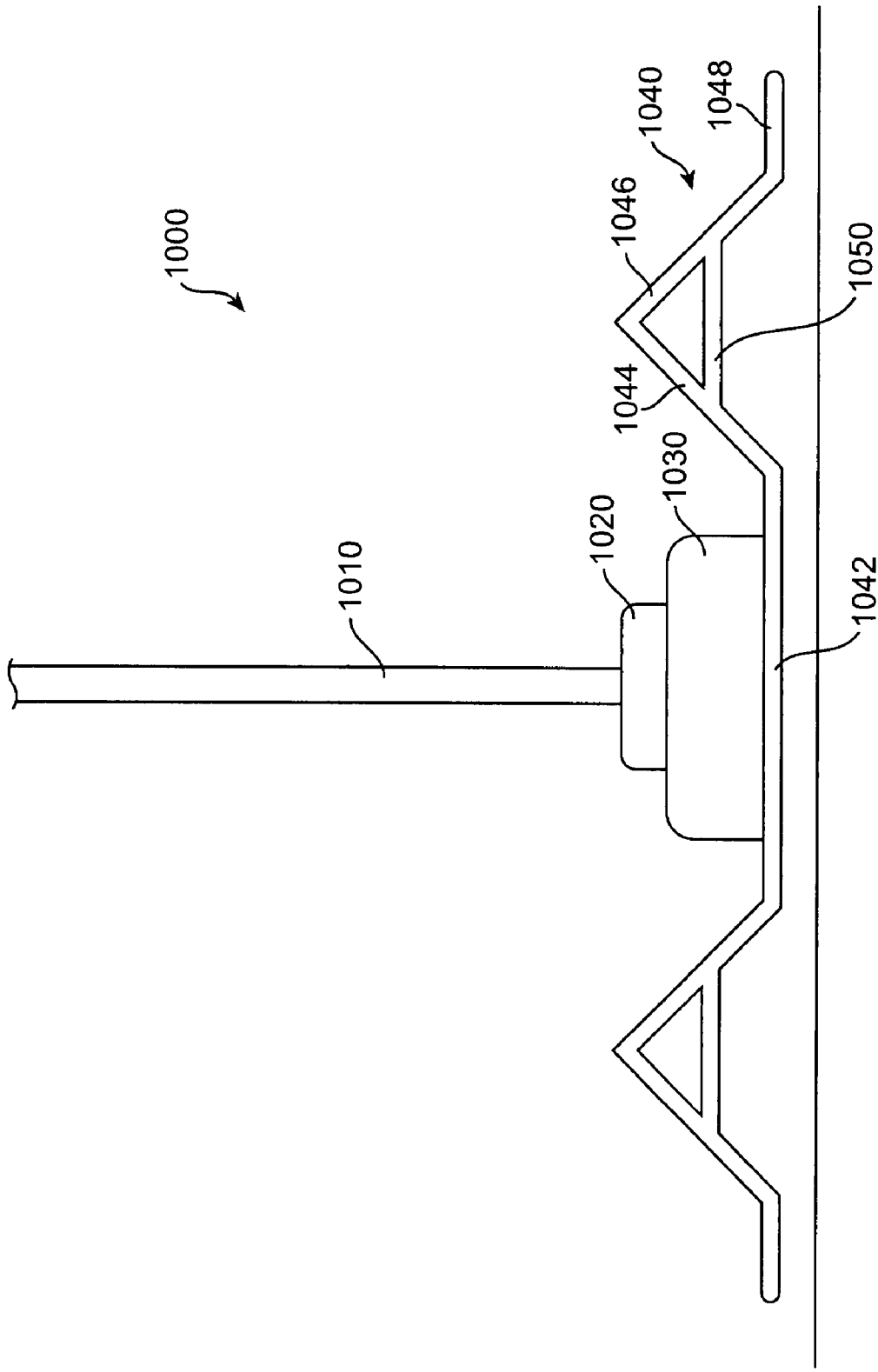

RETRACTABLE SOLAR PANEL SYSTEM

FIELD OF THE INVENTION

This invention generally relates to a system and method of reducing leeway drift of a sailboat as the sailboat reaches an upwind objective by adjusting the location and position of the foresail (i.e., headsail, jib, genoa, or spinnaker) and/or adjusting the depth of the keel and/or keel foil, and more particularly to a system and method of adjusting the location and position of the foresail (headsail, jib, genoa, or spinnaker) on a sailboat by moving the location or position of the foresail and the forestay relative to the bow of the sailboat and/or by adjusting the depth of the keel and/or keel foil.

BACKGROUND

Typically, a sailboat includes a hull that sits in the water, a mast extending upwardly from the hull, sails supported by the mast, and either a centerboard or fixed keel extending downwardly from the hull into the water. The sails catch the wind and cause the hull to move forwardly through the water. Although, a sailboat cannot sail directly into the wind, a sailboat can sail in a generally windward direction. It can be appreciated that with skill and a combination of maneuvers, a sailor can maneuver a sailboat in almost any desired direction.

Because of the design of the sails, a sailboat can sail to windward, which is typically in a direction no less than about 15 to 25 degrees from the wind, depending upon the design of the boat and the skill of the sailor. Headway directly upwind or windward is typically achieved in a series of sequential maneuvers called tacks, in which the boat is first sailed windward with the wind over one side of the bow, and then turned through the wind so that the wind comes over the other side of the bow. In each tack, some headway upwind is achieved even though the boat does not move directly into the wind, and eventually the sailboat reaches an upwind objective after sailing a zig-zag course covering a distance greater than the straight line distance from the initial position to the upwind objective.

When a sailboat sails to windward, the forces on the sails can be resolved into a thrust component that moves the sailboat forwardly through the water and a drift component that pushes the sailboat sideways in a downwind direction. The sailboat therefore moves in a net direction that is forward, but also is slight downwind opposite to the net intended direction of movement. The sideways drift is called leeway or "slide slipping."

The downwardly projecting centerboard or keel of the sailboat offers resistance to the leeway produced by the sideways sail force, but at least some leeway remains. This leeway is being constantly accumulated, as there is a downwind movement as long as the sailboat is being sailed into the wind. The leeway significantly increases the time required for the sailboat to sail from its downwind starting position to the upwind objective, as it forces the sailboat to sail much further to make up for the accumulated sideways movement.

Attempts have been made to reduce the amount of leeway. For example, a movable centerboard or fixed keel extending into the water below the sailboat presents a broad surface to resist sideways drift. There have also been attempts to modify the shape of the centerboard or keel to provide a lifting force to counteract the sideways drift. These attempts have been based upon the observation that the centerboard or keel moving through the water is somewhat similar to the wing of an airplane that creates a lift as the wing is moved through the air. The lift of an airplane wing causes the airplane to move upward against the force of gravity, and the corresponding lift of a sailboat centerboard or keel that extends downwardly can cause the sailboat to be lifted in the upwind direction, thereby countering the sideways drift producing the leeway.

Fixed keels are typically used in larger sailboats. The keels are usually filled with lead or other dense material to act as ballast for the sailboat. For example, the keels of 12-meter sailboats may extend 10 feet below the surface of the water, and weigh 40,000 to 50,000 pounds.

It would be desirable to have a system or method of adjusting or changing the relative position of the fixed connection of the foresail, such that the angle of attack in the windward direction is slightly altered in the direction of the wind. Accordingly, it would be desirable to have a system and/or method of changing the angle or direction of the boat in a windward direction and/or use of an extendable keel, which is capable of providing a lifting force to counteract leeway, and is sufficiently reliable to be acceptable for general and racing use.

In addition, it would be desirable to have a retractable solar panel system, which can provide a source of energy to the sailboat. The solar panel system can be attached to a nautical stay, wherein the stay is fixed at one end to a hull of the sailboat and at a second end to a mast of the sailboat. The solar panel system includes a plurality of solar panels, which are attached to a system for extending and retracting the plurality of solar panels, such that when not in use, the solar panels can be stacked.

SUMMARY

In accordance with one embodiment, a system for sailing windward comprises: a moveable track fixture; a fixed track configured to receive the track fixture; and a control system for securing the location of the track fixture within the fixed track relative to a bow of a sailboat.

In accordance with another embodiment, a sailboat comprises: a hull; a mast; a plurality of sails, wherein at least one of the plurality of sails is a foresail; and a system for sailing windward comprising: a moveable track fixture; a fixed track configured to receive the track fixture; a control system for securing the location of the track fixture within the fixed track relative to a bow of a sailboat; and a forestay attached to the track fixture, the forestay extending from an upper portion of a mast of a sailboat to the moveable track fixture on a bow of the sailboat.

In accordance with a further embodiment, a keel for a sailboat comprises: an extendable keel comprising: a foil member; an inner member; and an outer member; and a control system comprised of an inner screw member and a winch system for lowering or retracting the inner member.

In accordance with another embodiment, a keel for a sailboat comprises: a fixed keel; a moveable inner member positioned within the fixed keel; and a control system comprised of an inner screw member and a winch system for lowering or retracting the inner member.

In accordance with a further embodiment, a retractable solar panel system for a sailboat comprises: a plurality of solar panels, which are attached to a nautical stay, wherein the stay is fixed at one end to a hull of the sailboat and at a second end to a mast of the sailboat; and a system for extending and retracting the plurality of solar panels.

In accordance with another embodiment, a method of reducing leeway drift of a sailboat as the sailboat reaches an upwind objective, the method comprises changing the relative position of a foresail to a bow of the sailboat without changing the relative position of a mainsail and the foresail to one another.

In accordance with a further embodiment, a retractable solar panel system comprises: a plurality of solar panels; and a system for extending and retracting the plurality of solar panels.

In accordance with another embodiment, an adjustable solar system, the system comprises: an upper support member and a lower support member, which are pivotally attached to one another at a pivot point; and a plurality of solar panels attached to the upper support member.

In accordance with a further embodiment, a kit for generating energy, the kit comprises: an adjustable solar system, the adjustable solar system comprising an upper support member and a lower support member, which are pivotally attached to one another at a pivot point; at least one solar panel, the at least one solar panel configured to be attached to the upper support member; and at least one storage device, wherein the at least one storage device is configured to store energy generated by the at least one solar panel.

BRIEF DESCRIPTION OF THE DRAWINGS

FIG. 12 is a plan view of a retractable solar panel array in accordance with one embodiment.

FIG. 13 is a plan view of a retractable solar panel array in accordance with another embodiment.

FIG. 14 is a front view of a retractable solar panel system in accordance with another embodiment.

FIG. 20 is a plan view of a base unit for a retractable solar system.

DETAILED DESCRIPTION

As described above, because of the design of the sails, a sailboat (or boat) 10 can sail to windward, in a direction no less than about 15 to 25 degrees from the wind, depending upon the design of the boat and the skill of the sailor. Headway directly upwind is achieved in a series of sequential maneuvers called tacks, in which the boat is first sailed windward with the wind over one side of the bow, and then turned through the wind so that the wind comes over the other side of the bow. In each tack, some headway upwind is achieved even though the boat does not move directly into the wind, and eventually the sailboat reaches an upwind objective after sailing a zig-zag course covering a distance greater than the straight line distance from the initial position to the upwind objective.

In addition, when a sailboat 10 sails to windward, the forces on the sails can be resolved into a thrust component that moves the sailboat forwardly through the water and a drift component that pushes the sailboat sideways in a downwind direction. The sailboat 10 therefore moves in a net direction that is forward, but also is slight downwind opposite to the net intended direction of movement. The sideways drift is called leeway.

The downwardly projecting centerboard or keel of the boat offers resistance to the leeway produced by the sideways sail force, but at least some leeway remains. This leeway is being constantly accumulated, as there is a downwind movement as long as the sailboat is being sailed into the wind. It can be appreciated that the leeway can significantly increase the time required for the sailboat to sail from its downwind starting position to the upwind objective, as it forces the sailboat to sail much further to make up for the accumulated sideways movement.

Figure 1:
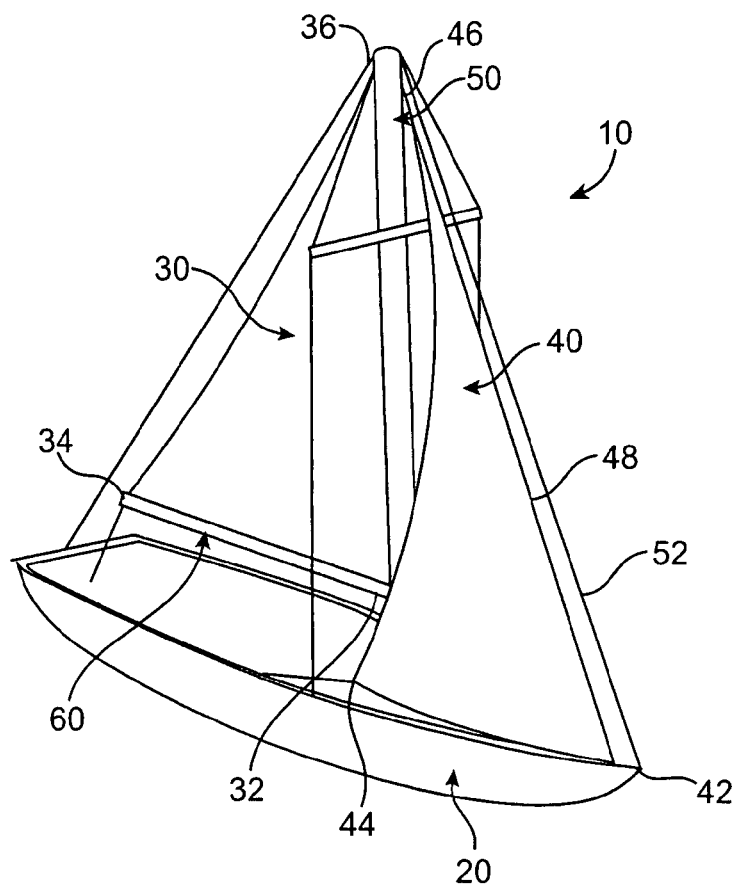
FIG. 1 is a perspective view of a sailboat with a system and method of adjusting the location and position of the foresail in accordance with one embodiment.

FIG. 1 shows a perspective view of a sailboat 10 with a system and method of adjusting the location and of at least one of the sails 40 of the sailboat 10, and more particularly a system and method of adjusting the foresail 40 (or headsail, jib genoa, or spinnaker) in accordance with one embodiment. As shown in FIG. 1, a sailboat 10 typically includes a hull 20 that sits in the water, a mast 50 extending upwardly from the hull 20, and at least one sail in the form of a mainsail 30 supported by the mast 50 and a boom 60, and an optional centerboard or keel 70 (FIG. 6)) extending downwardly from the hull 20 into the water. Typically, most sailboats 10 also include a second sail 40 in the form of a foresail, jib, genoa, or spinnaker. The sails 30, 40 catch the wind and cause the hull 20 to move forwardly through the water. It can be appreciated that the sailboat can also include a mainstay 52, which preferably extends from an upper portion of the mast 50 to the bow 42 of the sailboat 10.

It can be appreciated that the use of the term "sailboat" 10 has a broad meaning and can include yachts, (large sailboats) and smaller vessels of many configurations, which use wind as the primary means of propulsion. Typically, some of the variations other than size are hull configuration (monohull, catamaran, and trimaran), keel type (full, fin, wing, centerboard etc.), purpose (sport, racing, cruising), number and configuration of masts, and the sail plan. The most common sailboat 10 is the "sloop" which features one mast 50 and two sails, a mainsail 30 and a foresail 40 or jib, genoa, or spinnaker. This simple configuration has been proven over time to be very efficient for sailing into the wind. The mainsail 30 is attached to the mast 50 and the boom 60, which is a beam or spar capable of swinging across the sailboat 10, depending on the direction of the wind. Depending on the size and design of the foresail 40, the foresail 40 is called a jib, genoa, or spinnaker. Although not common, a sloop or sailboat 10 can include two foresails from a single forestay 48 at one time (wing on wing). The forestay 48 is a line or cable running from near the top of the mast 50 to a point near the bow 42 (or front of the sailboat 10). It can be appreciated that the forestay 48 is attached at either the top of the mast, or in fractional rigs between about ¼ and ⅛ from the top of the mast 50. The other end of the forestay 48 is attached to the stern or bow 42 of the boat 10. The forestay 48 can be made from stainless steel wire, a solid stainless steel rod, a carbon rod, a galvanized wire or natural fibers.

As shown in FIG. 1, the mainsail 30 is attached to the mast 50 and the boom 60. The boom 60 is typically a metal or wooden beam or spar, which is configured to stabilize the bottom of the mainsail 30. The boom 60 is attached to the mast 50 at a lower end 32 of the mast 50 and extends towards the stern 43 (or back of the sailboat 10). An outhaul or line 34, which is part of the running rigging of a sailboat 10, is used to extend the mainsail 30, and control the shape of the curve of the foot of the mainsail 30. The outhaul 34 runs from the clew (the back corner of the sail 30) to the end of the boom. The line is pulled taut to the appropriate tension (to provide the desired shape to the foot), and then secured to a cleat on the boom 60. The mainsail 30 is also attached to the top 36 of the mast 50. The mainsail 30 extends aftward and is secured the whole length of its edges to the mast 50 and to the boom 60 hung from the mast 50.

The foresail 40, which is also known as a headsail, jib, genoa, or spinnaker is secured to the top 46 of the mast 50 and is typically secured to the bow 42 of the sailboat 10. Typically, the foresail 40 is secured along its leading edge to a forestay 48 (strong wire) strung from the top 46 of the mast to the bowsprit 42 on the bow (nose) of the boat. Alternatively, the foresail 40 can be a genoa, which is a type of jib that is larger, and cut so that it is fuller than an ordinary jib. It can also be appreciated that fore-and-aft sails can be switched from one side of the sailboat 10 to the other, in order to alter the sailboat's course. When the sailboat's stern crosses the wind, this is called jibing; when the bow crosses the wind, it is called tacking. Tacking repeatedly from port to starboard and/or vice versa, called "beating", is done in order to allow the boat to follow a course into the wind.

It can be appreciated that a primary feature of a properly designed sail is an amount of "draft", caused by curvature of the surface of the sail. When the sail is oriented into the wind, this curvature induces lift, much like the wing of an airplane. Modern sails are manufactured with a combination of broad-seaming and non-stretch fabric. The former adds draft, while the latter allows the sail to keep a constant shape as the wind pressure increases. The draft of the sail can be reduced in stronger winds by use of a Cunningham and outhaul, and also by increasing the downward pressure of the boom by use of a boom vang. A boom vang is a line or piston system on a sailboat used to exert downward force on the boom and thus control the shape of the sail. In British English, it is known as a "kicking strap". The vang typically runs from the base of the mast 50 to a point about a third of the way out the boom 60. Due to the great force necessary to change the height of the boom 60 while a boat is under sail, a line based boom vang usually includes some sort of a pulley system. Hydraulic piston vangs are used on larger sailboats and controlled by manual or electric hydraulic pumps.

Figure 2:
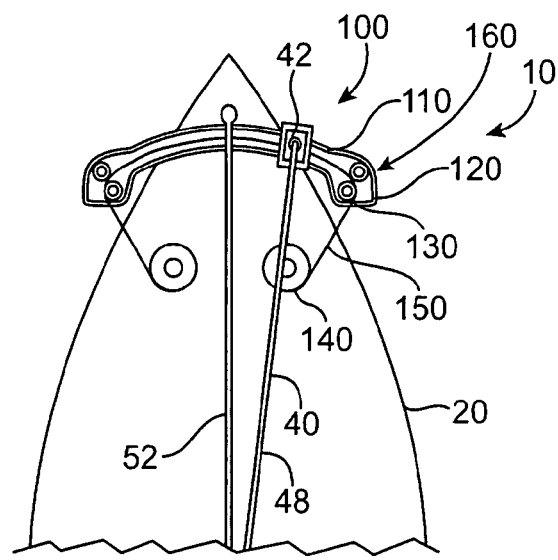
FIG. 2 is a top view of the sailboat of FIG. 1 with a system and method of adjusting the location and position of the foresail.

FIG. 2 shows a top view of the sailboat 10 of FIG. 1 with a system and method of adjusting the location and position of the foresail 40. As described above, the foresail 40 is typically attached to the bow 42 of the sailboat 10 via the forestay 48. In accordance with one embodiment, as shown in FIG. 2, the foresail 40 can be attached to a track system 100. The track system 100 is attached to the bow 42 of the boat 10 and is configured to change the location or position of the foresail 40 and the forestay 48 relative to the hull 20 of the boat 10 during a tacking maneuver.

It can be appreciated that tacking typically describes the position of a sailboat's bow with respect to the wind. For example, if the vessel's bow is positioned so that the wind is blowing across the starboard (right) side of the vessel, then the vessel is said to be on a starboard tack. If the wind is blowing across the port (left) side of the vessel, then the vessel is said to be on a port tack. It can be appreciated that by definition, this is opposite to the side, which the boom is carried, since it can be difficult when a boat is sailing downwind or nearly downwind from which side the wind is coming. In addition, a sailing vessel on a starboard tack always has the right-of-way over another sailing vessel on "port tack" by both the rules of the road and racing rules.

The track system 100 preferably includes a moveable track fixture 110, upon which the forestay 48 is securely fixed or attached, a fixed track 120 configured to receive the track fixture 110, and a control system 130 for securing the location of the track fixture 110 within the track 120 relative to the bow 42 of the boat 10. In accordance with one embodiment, the control system 130 for securing the location of the track fixture 110 can include a winch 140, a flexible wire or rod 150 attached to the track fixture 110, and a guide system 160. The winch 140 is preferably a mechanical device that is used to wind up the flexible wire or rod 150 (also called "cable"). In its simplest form, it consists of a spool and attached crank. The spool can also be called the winch drum. It can be appreciated that the winch 140 can include suitable gear assemblies and can be powered by electric, hydraulic, pneumatic or internal combustion drives. In addition, the winch 150 can include a solenoid brake and/or a mechanical brake or ratchet (not shown) that prevents the winch 150 from unwinding.

Figure 3A:
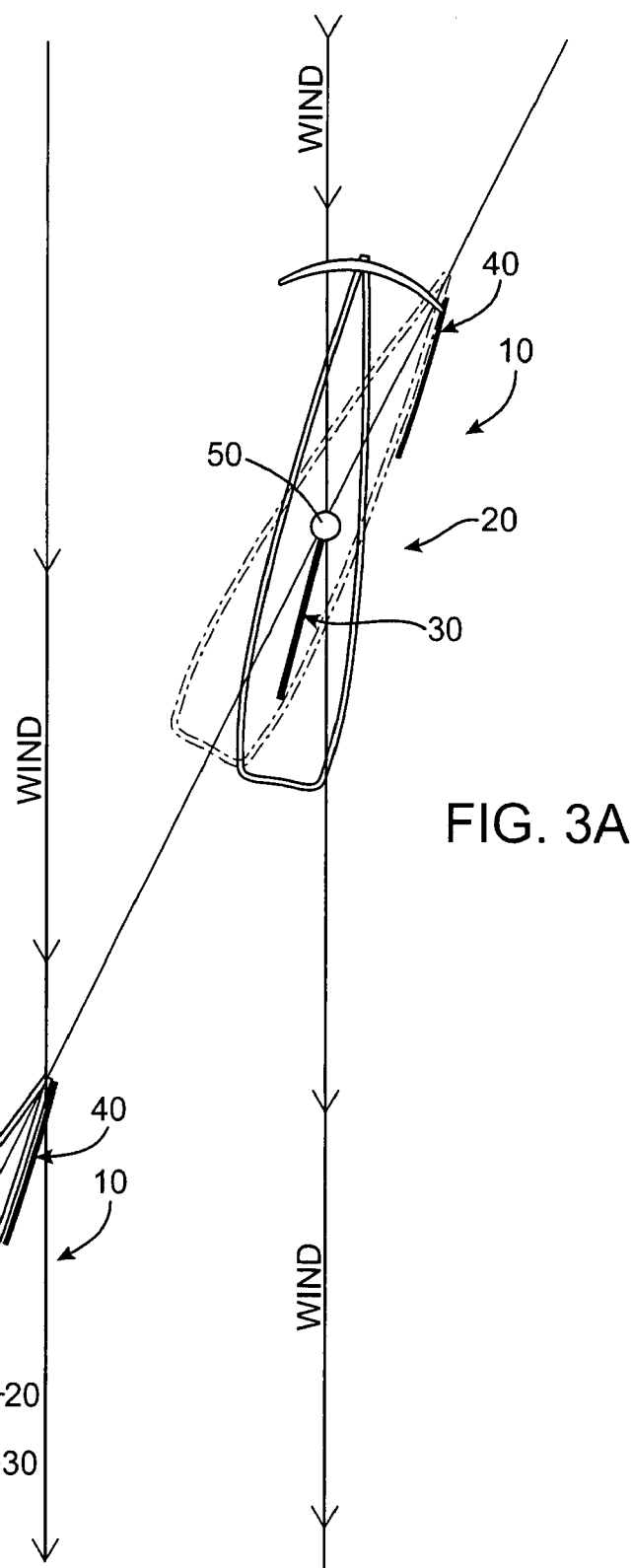
FIG. 3A is a schematic view of a sailboat in accordance with one embodiment with a system and method of adjusting the location and position of the foresail in comparison with a sailboat without a system and method of adjusting the location and position of the headsail, jib, genoa, or spinnaker.

FIG. 3A shows a schematic view of a sailboat 10 in accordance with one embodiment with a system and method of adjusting the location and position of the foresail 40 in comparison with a sailboat 10 without a system and method of adjusting the location and position of the foresail 40. As shown in FIG. 3A, the control system 130 is configured to adjust or change the relative location of the foresail 40 to the bow 42 of the boat 10 during tacking maneuvers, such that the bow 42 of the boat 10 can sail into the wind more than if the foresail 40 and forestay 48 is fixed to the bow of the boat 10.

Figure 3B:
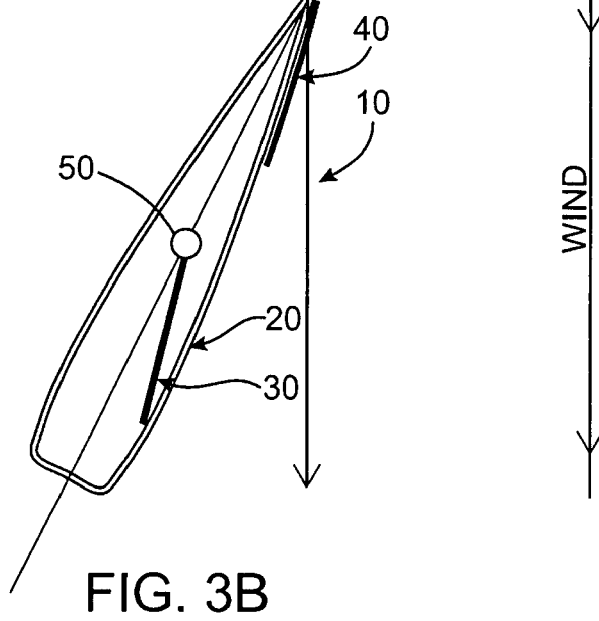
FIG. 3B is a schematic view of a sailboat without a system and method of adjusting the location and position of the foresail.

FIG. 3B shows a schematic view of a sailboat without a system and method of adjusting the location and position of the foresail. As shown in FIG. 3B, a typical sailboat 10 performs a tacking maneuver by sailing at an angle into the wind. However, as shown in FIG. 3A, if the relative position of the foresail 40 to the bow 42 of the boat 10 is changed or altered without change the relative position of the mainsail 30 and foresail 40 to one another, the bow 42 of the boat 10 can sail more into the wind resulting in a shorter distance or path of travel for the sailboat during tacking.

Figure 4:
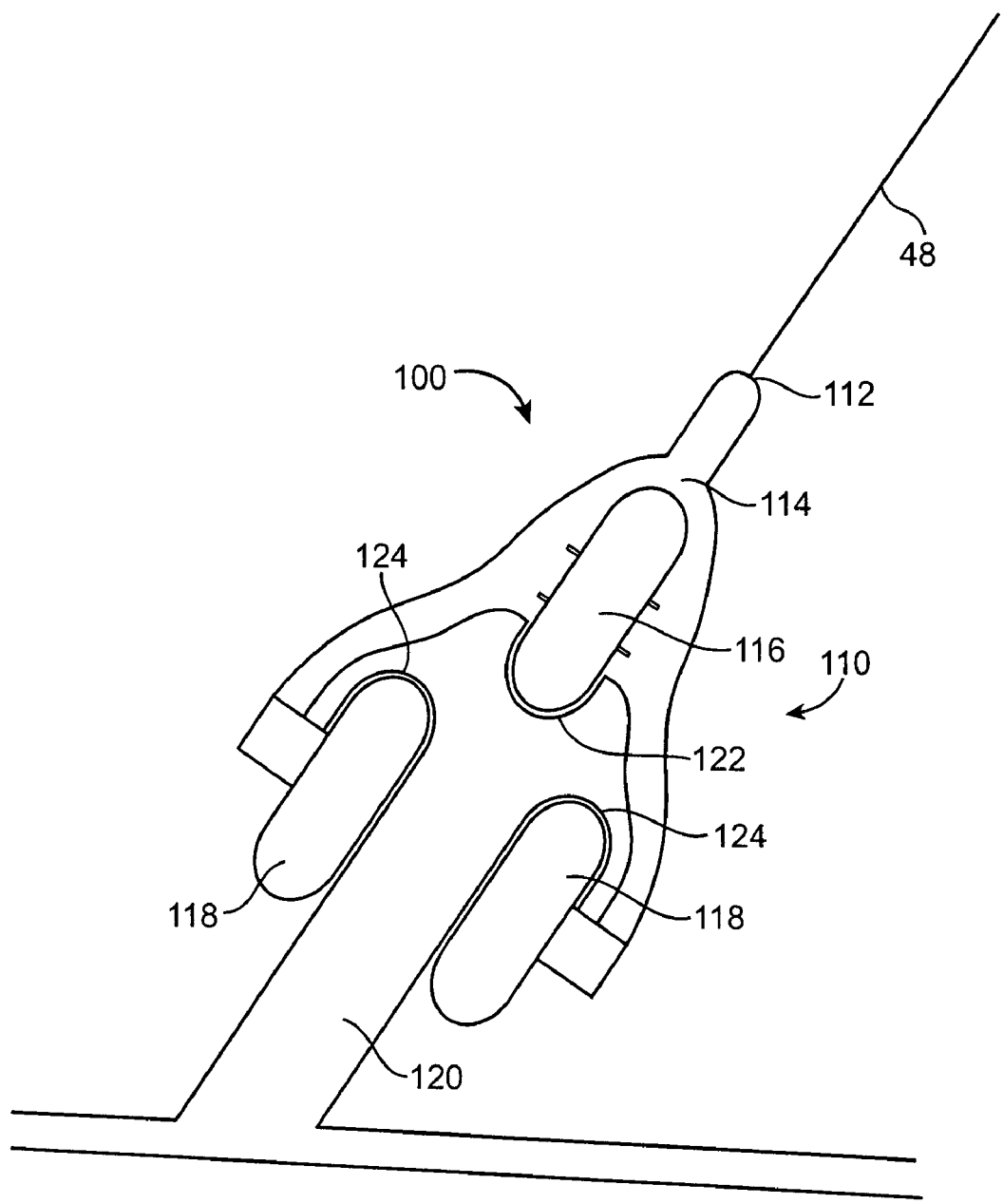
FIG. 4 is a cross-sectional view of a portion of the track system on a sailboat with a system and method of adjusting the location and position of the foresail.

FIG. 4 shows a cross-sectional view of a portion of the track system 100 on a sailboat with a system and method of adjusting the location and position of the foresail 40 in accordance with one embodiment. The track system 100 preferably includes a track fixture 110, and a fixed track 120. The foresail 40 (not shown) is attached to the forestay 48, which is secured to the track fixture 110 at an upper end 112. As shown in FIG. 4, the track fixture 110 can include an upper end 112, a main body 114, an upper wheel 116, and a pair of lower wheels 118. The fixed track 120 can include an upper groove 122 configured to receive the upper wheel 116 and a pair of lower grooves 124 configured to receive the pair of lower wheels 118. The track fixture 110 moves from side to side (starboard to port) on the fixed track 120 resulting in the relative position of the forestay 48 (and the foresail 40) to the bow 42 of the boat 10 facing in a more windward direction during tacking maneuvers.

Figure 5:
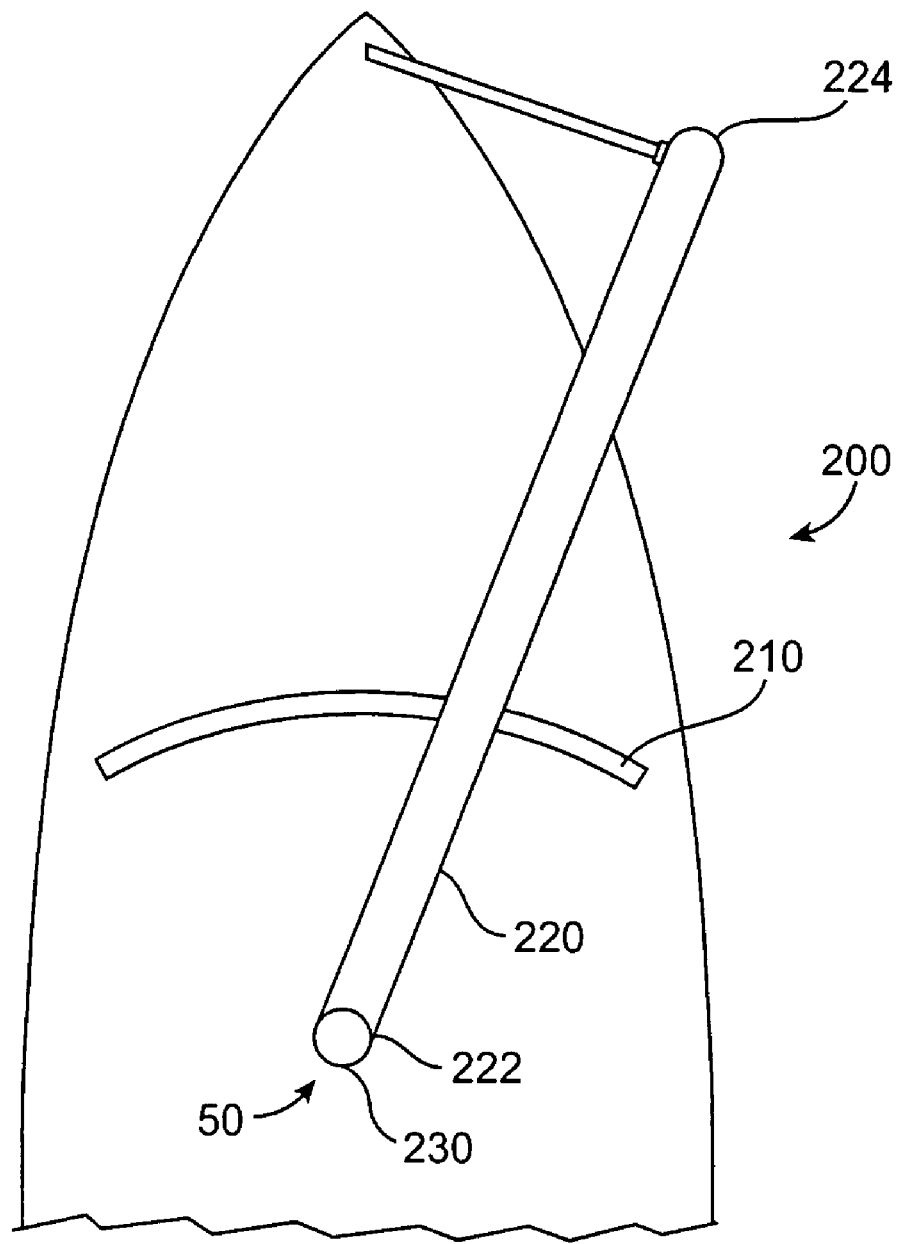
FIG. 5 is a top view of a sailboat with a system and method of adjusting the location and position of the foresail in accordance with another embodiment.

FIG. 5 shows a top view of a sailboat 10 with a system and method of adjusting the location and position of the foresail 40 in accordance with another embodiment. As shown in FIG. 5, a beam or spar system 200 comprised of a foresail track system 210, a foresail beam 220, and a pivot member 230. The foresail beam 220 is attached to the pivot member 230 (or mast 50) at one end (mast end) 222 and the other end (bow end) 224 of the foresail beam 220 moves from side to side (starboard to port). The foresail beam 220 is preferably attached to an optional foresail track system 210, which assists the foresail beam 220 in movement from side to side. The forestay 48 (not shown) is preferably securely fixed or attached to the bow end 224 of the foresail beam 220. In addition, a series of lines 226 can be used to control the bow end 224 of the foresail beam 220.

It can be appreciated that the system as shown in FIG. 5, the beam or spar system 200 can also include a control system 130 (not shown) comprised of a winch 140, a flexible wire or rod 150 attached to the track fixture 110, and a guide system 160. As described above, the winch 140 is preferably a mechanical device that is used to wind a wire rod or wire rope (also called "cable"). In its simplest form, it consists of a spool and attached crank. In addition, it can be appreciated that the winch 150 can also include gear assemblies and can be powered by electric, hydraulic, pneumatic or internal combustion drives. The winch 150 can also include a solenoid brake and/or a mechanical brake or ratchet, which prevents the winch 150 from unwinding.

Figure 6:
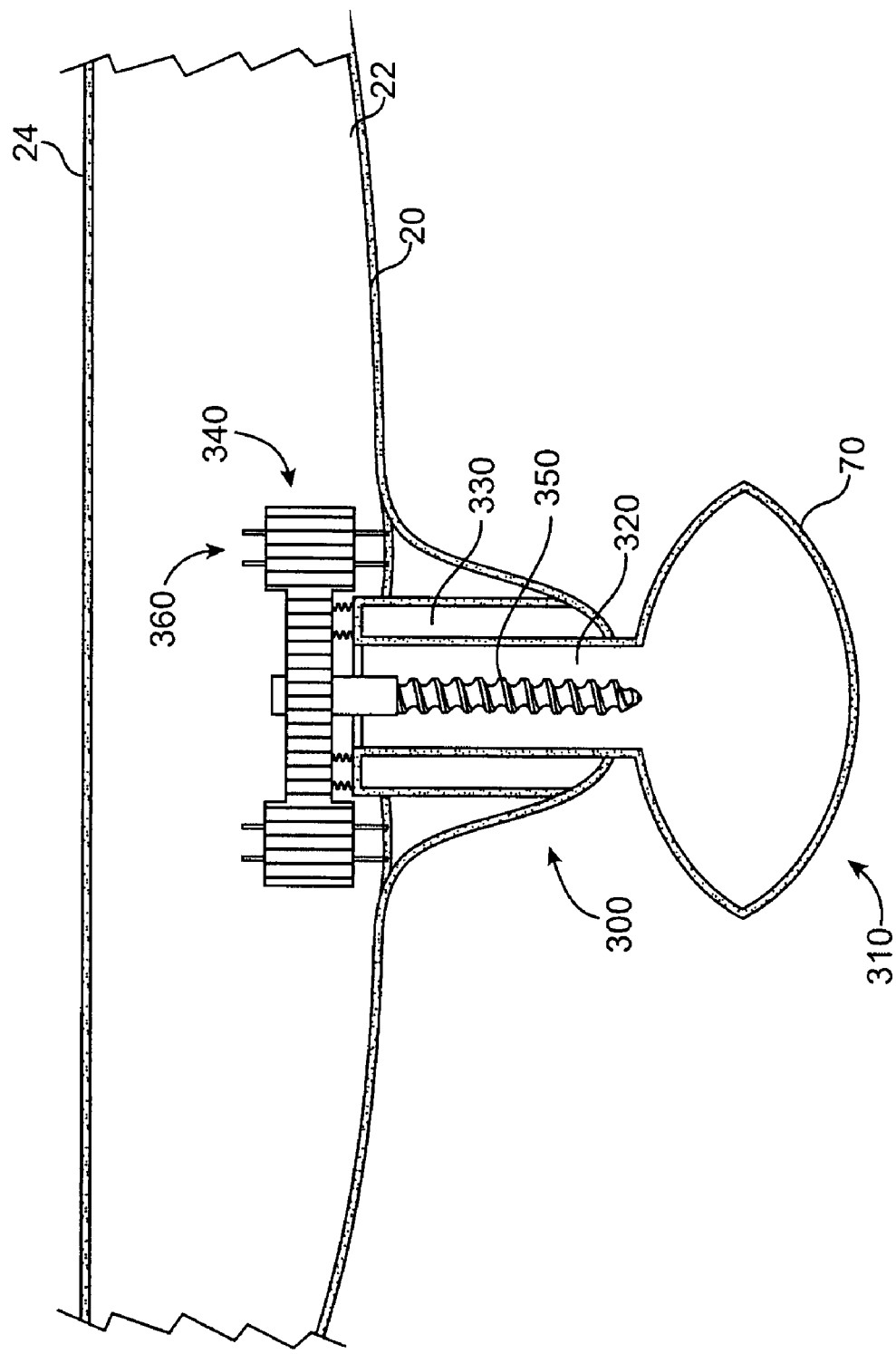
FIG. 6 is a cross-sectional view of a sailboat with an extendable keel in accordance with one embodiment.

FIG. 6 shows a cross-sectional view of a sailboat 10 with an extendable keel 300 in accordance with another embodiment. As shown in FIG. 6, the extendable keel 300 includes a foil member 310, an extendable inner member 320 and a fixed outer member 330. The foil member 310 is attached to the extendable inner member 320 and uses the forward motion of the boat 10 to generate lift to counter the lateral force from the sails (i.e., mainsail 30 and foresail 40). It can be appreciated that sailboats 10 typically have much larger keels than non-sailing hulls. In addition, the keel 70 is made of a heavy material to provide ballast to stabilize the sailboat 10. Accordingly, it would be desirable to have the ability to adjust the depth or length of the keel 70, which provide a righting moment of the sailboat 10 during tacking, and reducing the weight of the keel 70. It can be appreciated that by reducing the weight of the keel 70, which in turn reduces the overall weight of the sailboat 10, the sailboat 10 will in turn move faster through the water. Thus, the sailboat 10 will be quicker and will be faster during sailing competitions and/or races. In addition, the perpendicular distance from weight to pivot is increased. Thus, with the use of an extendable keel 300, a larger righting moment can be produced. The extendable keel 300 also provides for easier transportation of the sailboat 10 by retracting the keel 70 and allows for the sailboat 10 to sail in shallower water with the keel 70 retracted.

As shown in FIG. 6, the extendable inner member 320 is positioned within the fixed outer member 330. A suitable fit between the inner member 320 and the outer member 330 preferably exists such that the sailboat 10 does not take water on and the fit is suitable to withstand the corrosive environment that most sailboats 10 typically encounter. In accordance with one embodiment, the inner member 320 extends and retracts through a control system 340 and an inner screw member 350 positioned within the inner member 320. As shown in FIG. 6, the control system 340 controls the depth or position of the inner screw member 350, which in turn lowers or retracts the inner member 320. The inner screw member 350 is preferably attached to a winch system 360 or other suitable system for lowering or extending and/or retracting the keel 70.

In accordance with one embodiment, the winch system 360 can include a mechanical device that is used to control the relative position of the inner screw member 350 and the inner member 320 to the outer member 330, which in turn controls the depth of the foil member 310 of the keel 70. In accordance with one embodiment, the winch system 360 consists of a spool or drum and an attached crank. It can be appreciated that the winch 140 can also include suitable gear assemblies and/or can be powered by electric, hydraulic, pneumatic or internal combustion drives. The winch system 360 also preferably includes a solenoid brake and/or a mechanical brake that prevents the winch system 360 from unwinding and/or releasing from a fixed position. The winch system 360 can be positioned below the deck of the sailboat 10 as shown in FIG. 6, or alternatively can be positioned above or on the deck of the sailboat 10.

It can be appreciated that the extendable keel 300 can also be extendable telescopically, wherein the keel 300 comprises a plurality of inner members 320 having a core containing a plurality of sealed air chambers, which are pressurized when the keel 300 is fully extended. An air compressor, which can be powered by the boat engine or other suitable systems, can be utilized to supply pressurized air to extend or retract the inner members 320. Valves can control the pressure release for extension or retraction. The keel 300 can also be operated hydraulically, by stored or generated pressurized gas, or mechanically through a suitable mechanical system.

Figure 7:
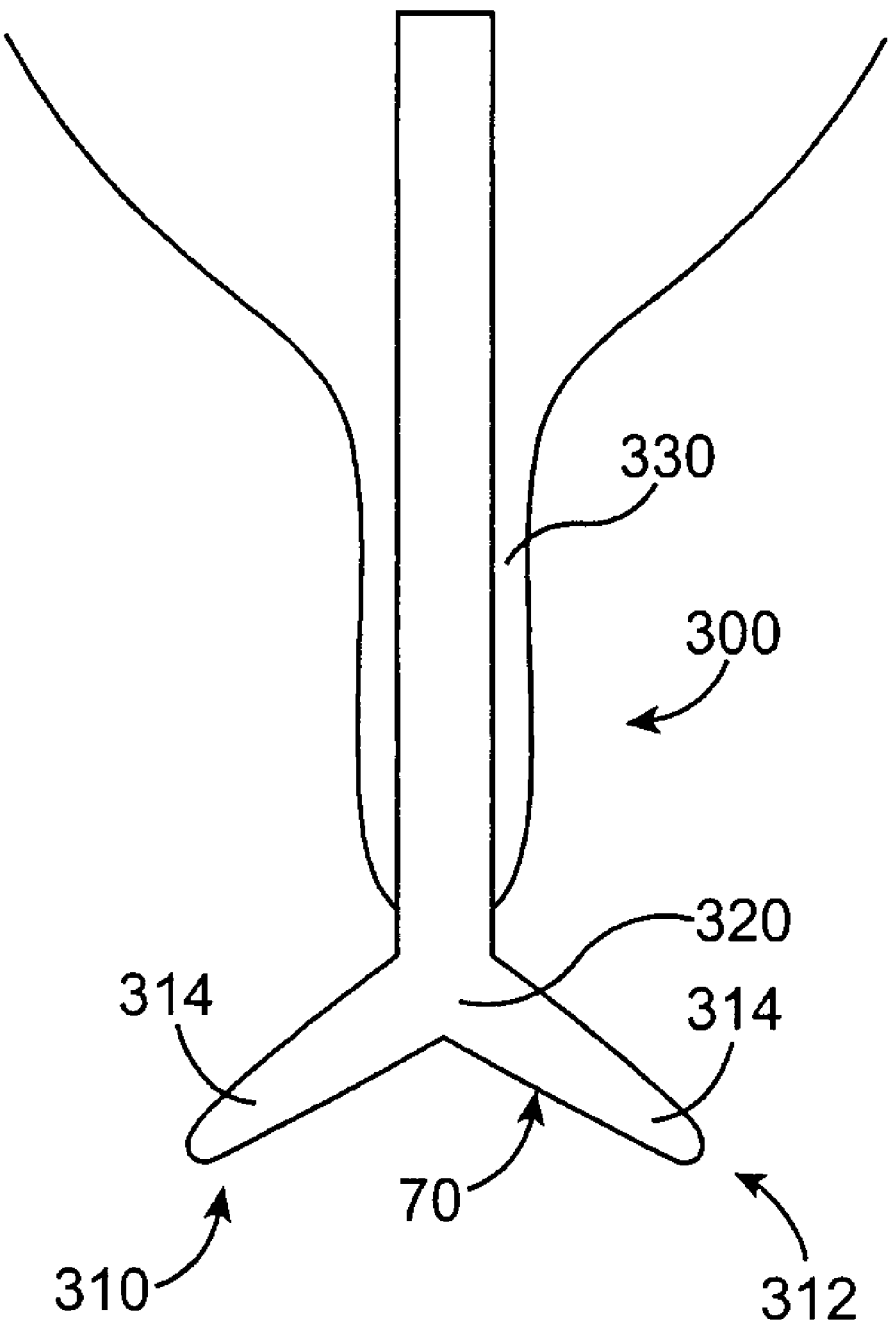
FIG. 7 is a front view of a sailboat with the extendable keel having a winged foil (or underwater wing) in accordance with another embodiment.

FIG. 7 shows a front view of a sailboat 10 with the extendable keel 300 having a foil member 310 having a winged foil 312 (or underwater wing) in accordance with another embodiment. As shown in FIG. 7, the foil member 310 is positioned on a distal end (or of the inner member 320 and has a pair of wings or foils 314. The winged foil 312 (or underwater wing), which has recently become popular for racing sailboats, the lift of such a winged foil 312 is largely upwardly (rather than laterally, as for a leeway reducing keel) to reduce the wetted area of the hull 20 and thence its drag as the sailboat 10 moves forwardly.

Figure 8:
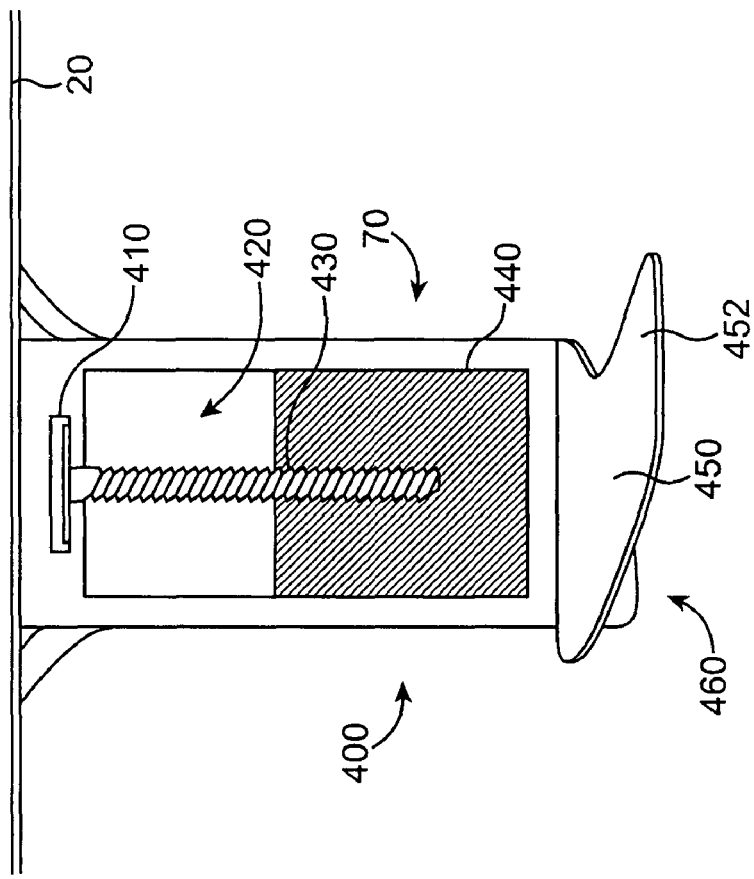
FIG. 8 is a cross-sectional view of a portion of a sailboat with a fixed keel and an adjustable ballast or weight system in accordance with a further embodiment.

FIG. 8 shows a cross-sectional view of a portion of a sailboat 10 with a fixed keel 70 and an adjustable ballast or weight system 400. Typically, by placing the weight of the ballast or weight system 400 as low as possible (often in a large bulb 460 at the bottom of the keel) the maximum righting moment can be extracted from the given mass. However, it can be appreciated that in certain sailing conditions, it may be desirable to adjust the location of the weight system 400 within the keel 70.

As shown in FIG. 8, the ballast or weight system 400 is comprised of a moveable weight 440 comprised of a high density material, such as concrete, iron, or lead, which is placed within the keel 70. The weight system 400 is adapted to fit within an inner chamber 420 of the keel 70 and includes a control system 410 for adjusting the depth of the weight system 40 within the chamber 420. In accordance with one embodiment, the control system 410 can include an inner screw member 430, which raises and lowers the weight system 400 within the inner chamber 420. The control system 410 controls the depth or position of the inner screw member 430, which in turn lowers or retracts the weight system 400. The inner screw member 430 is preferably attached to a winch system or other suitable system for lowering or extending and/or retracting the weight system 400 within the keel 70.

In accordance with one embodiment, the control system 410 can include a mechanical device that is used to control the relative position of the inner screw member 430, which in turn controls the depth of the weight system 400 within the inner chamber 420 of the keel 70. In accordance with one embodiment, the control system 410 consists of a spool or drum and an attached crank. It can be appreciated that the control system 410 can also include suitable gear assemblies and/or can be powered by electric, hydraulic, pneumatic or internal combustion drives. The control system 410 also preferably includes a solenoid brake and/or a mechanical brake that prevents the system from unwinding and/or releasing from a fixed position.

As shown in FIG. 8, the keel 70 also can include a foil member 450 having a winged foil 452 (or underwater wing) positioned on a distal end of the keel 70. The foil member 450 with a winged foil 452 provides lift in a largely upwardly direction (rather than laterally, as for a leeway reducing keel) to reduce the wetted area of the hull 20 and thence its drag as the sailboat 10 moves forwardly.

Figure 9:
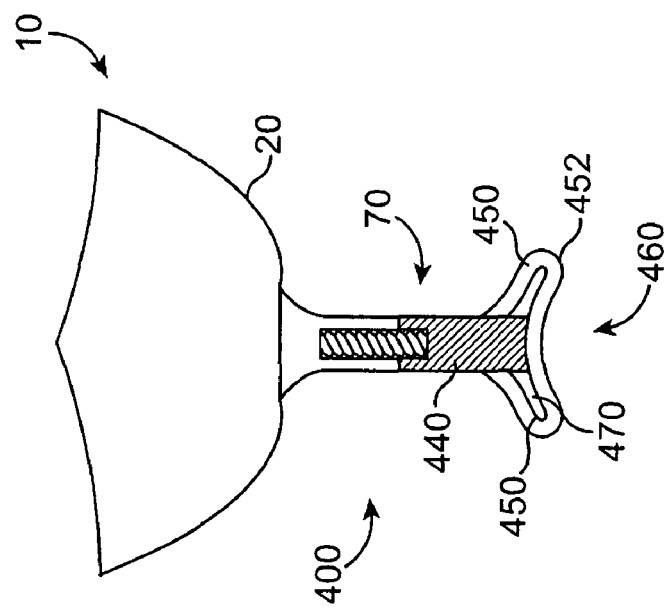
FIG. 9 is a cross-sectional view of a sailboat with a fixed keel with a hollow winged keel and an adjustable ballast or weight system in accordance with another embodiment.

FIG. 9 shows a cross-sectional view of a sailboat 10 with a fixed keel 70 with a hollow winged keel 460 and an adjustable ballast or weight system 400 in accordance with another embodiment. As shown in FIG. 9, the hollow winged keel 460 includes a foil member 450 having a winged foil 452 with a chamber 470 therein. The chamber 470 can be attached to a ballast system (not shown), which can be filled with either outside water or pressurized. The ballast system can be configured to provide the chamber 470 within the foil member 450 with a positively buoyant condition, weighing less than the volume of water it displaces, or negative buoyancy, which either increases its own weight or decreases the displacement of the water.

Figures 10, 11:
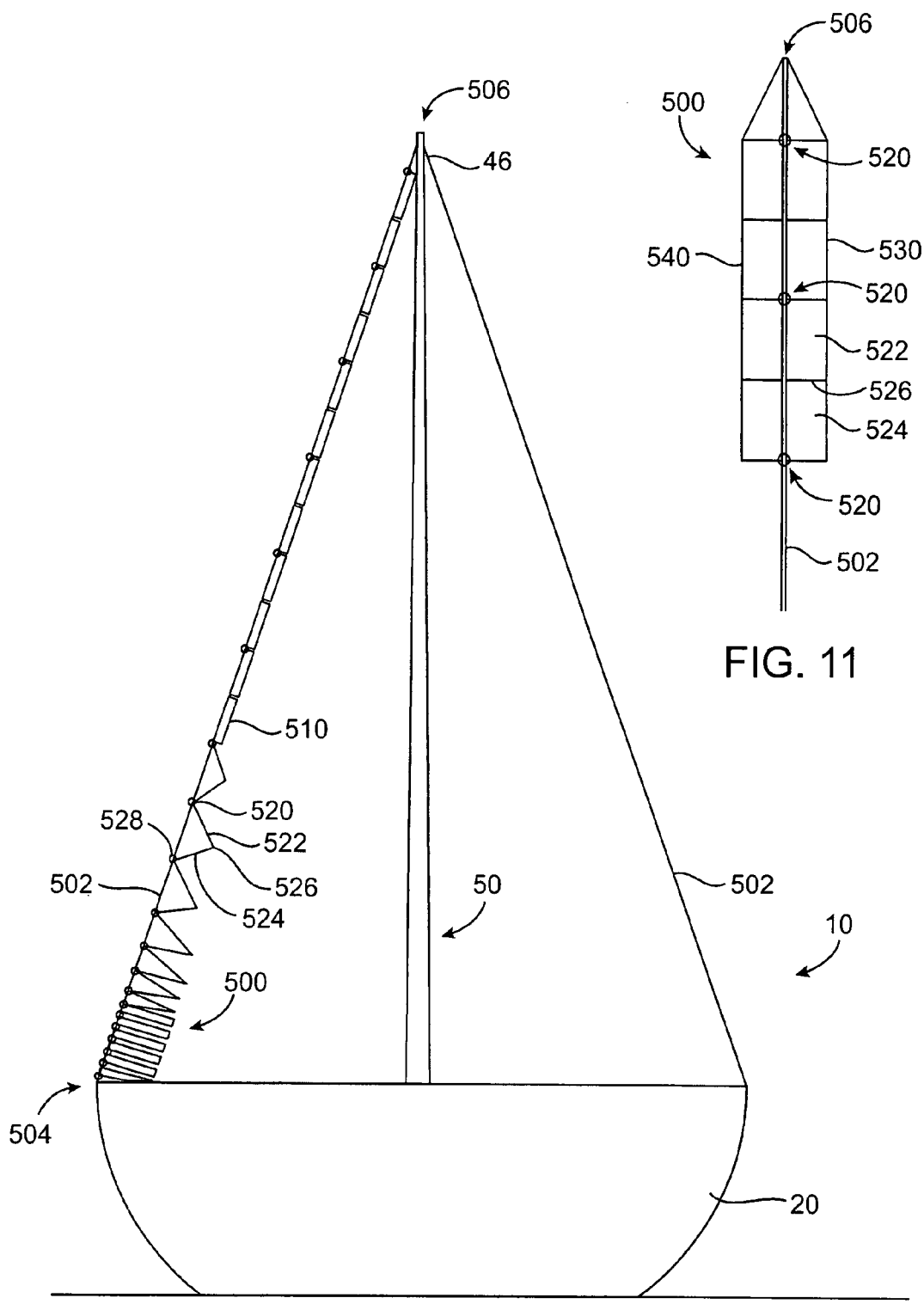
FIG. 10 is a plan view of a sailboat with a retractable solar panel system in accordance with one embodiment.
FIG. 11 is a front view of the retractable solar panel system of FIG. 10.

FIG. 10 is a cross-section view of a sailboat 10 with a retractable solar panel system 500 in accordance with another embodiment. As shown in FIG. 10, the retractable solar panel system 500 includes a plurality of solar panels 510, which are attached to a nautical stay 502. It can be appreciated that the stay (or shroud) 502 can include any suitable line, rope, wire or rod running from the masts to the hull, usually fore-and-aft along the centerline of the sailboat 10 or a shroud running from the mast 50 to the side of the sailboat 10. The stay or shroud 502 preferable is fixed at a one end 504 to the hull 20 of the sailboat 10 and at a second end 506 to the top or a top portion 46 of the mast 50.

The solar panels 510 are preferably any suitable panel or array of smaller panels, which converts sunlight into an energy source. It can be appreciated that any solar panel 510 can be used including flat solar thermal collector, such as a solar hot water or air panel used to heat water, air, or otherwise collect solar thermal energy, or any photovoltaic module, which is an assembly of solar cells used to generate electricity. The solar panels 510 are preferably flat, and can be various heights and widths. It can be appreciated, however, that the solar panels 510 can be slightly curved or of a suitable flexible design. In addition, each solar panel 510 can be comprised of an array of solar-thermal panels or photovoltaic (PV) modules, which are be connected either in parallel or series depending upon the design objective.

In accordance with one embodiment, the retractable solar panel system 500 preferably includes a plurality of solar panels 510, which are attached to the stay 502 via a connector 520 such as a connecting rod or hook. The system 500 also includes a system for the unfolding the plurality of solar panels 510 and extending the connector 520 (i.e., connecting rod or hook) upward towards the top portion 46 of the mast 50 when in use. It can be appreciated that when not in use, the solar panels 510 can be retracted and stored on the deck of the sailboat 10. The system for extension and retraction of the solar panels 510 is preferably a winch (e.g., 140) or other suitable mechanical device that is used to wind up a rope, or cable. The winch preferably includes a spool (or winch drum) and attached crank. It can be appreciated that the mechanical device or winch can be powered by electric, hydraulic, pneumatic or internal combustion drives, and includes a solenoid brake and/or a mechanical brake or ratchet that prevents it from unwinding.

A protective cover is preferably placed over the stack of solar panels 510 during storage thereof or when the solar panels 510 are not in use. As shown in FIG. 10, a pair of solar panels 522, 524 are attached to each preferably via the connector 520, which preferably is a connecting rod or hook, and can include a pair of hinges 526, 528 such that the plurality of solar panels 510 can be stored in a stack (i.e., z-fold) when not in use.

FIG. 11 is a front view of the retractable solar panel system 500 of FIG. 10 in accordance with one embodiment. As shown in FIG. 11, the panel system 500 comprises a pair of solar panels 522, 524 having a hinge 526, 528 between to allow the plurality of panels 510 to be stacked when not in use. The plurality of panels can also include at least one edge member 530, 540, which assists with the alignment of the solar panels 510 during use. The at least one edge member 530, 540 is preferably a wire, a hook attaching the outer edge of the solar panels to one another or other suitable method of attaching the panels to one another.

FIG. 12 is a plan view of a retractable solar panel array 600 in accordance with one embodiment. As shown in FIG. 12, a retractable solar panel array 600 can be comprised of a plurality of vertical solar panel systems 500. The solar panel systems 500 preferably includes a plurality of solar panels 510 attached to one another and attached to a fixed stay 502, or in the case of land fixed systems, the stay 502 can be a wire, a rope, a rod, or other suitable device, wherein the plurality of solar panels 510 can be stacked during non-use and unfolded during use. It can be appreciated that the use of the solar panel system 500 is not limited to sailboats 10, and that the solar panel system 500 can be placed on any suitable structure including residential and commercial buildings, windmills, water towers, billboards, support structures such as bridges, radio masts, antennas, and towers, and natural landforms, including hills, cliffs, fields, berms, mounds and valleys. In addition, the solar panel system 500 can be attached to modes of transportation such as buses, cars or automobiles, trucks, ships, aircraft and trains. In accordance with another embodiment, the solar panels 510 can be placed on floatation devices or a floatable element (not shown), and the retractable solar panel system 500 can be placed on any suitable body of water including lakes, ponds, rice paddies, oceans, and swimming pools.

FIG. 13 is a plan view of a retractable solar panel array 600 in accordance with another embodiment, wherein the retractable solar panel array 600 is fixed between a pair of vertical members 602, 604. As shown in FIG. 13, the solar panel systems 500 is positioned e horizontally fixed between the pair of vertical members 602, 604.

FIG. 14 is a front view of a retractable solar panel system 500 in accordance with another embodiment. As shown in FIG. 14, the retractable solar panel system 500 comprises a plurality of solar panels 510 (FIG. 11), or a roll of solar panel material 610, stored on a roll or drum system 620. During non-use, the plurality of solar panels 510 or the roll of solar panel material 610 are wound around a drum 630 or other suitable device. An optional handle 632 as shown or other suitable system, such as a small winch can be used to unroll and/or wrap the solar panel material 610 around the drum 630. During use, the plurality of solar panels 510 or the roll of solar panel material 610 is unwound extending from the drum 630 to a fixed point 506. It can be appreciated that the solar panels 510 or the roll of solar panel material 610 are preferably photovoltaic cells or modules.

In accordance with one embodiment, the solar panels 610 in the form of photovoltaic cells or modules (or a group of cells electrically connected and packaged in one frame), which convert sunlight directly into electricity. The photovoltaic (PV) cells can be made of a semiconductor material such as silicon, such that when light strikes the cell, a certain portion of it is absorbed within the semiconductor material. The energy of the absorbed light is transferred to the semiconductor, and knocks the electrons loose, allowing them to flow freely. In addition, photovoltaic (PV) cells also all have one or more electric fields that act to force electrons freed by light absorption to flow in a certain direction. The flow of electrons is a current, which can be used externally by placing metal contacts on the top and bottom of the PV cell. This current, together with the cell's voltage (which is a result of its built-in electric field or fields), defines the power (or wattage) that the solar cell produces.

Figure 15:
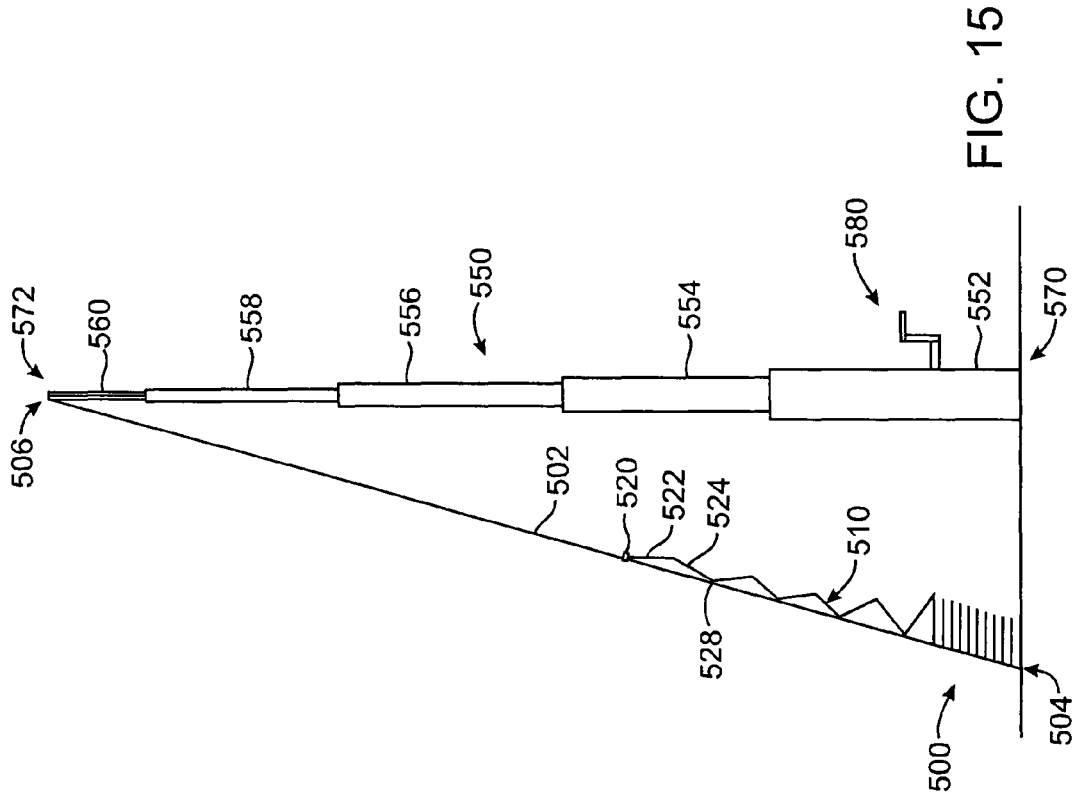
FIG. 15 is a plan view of a retractable solar panel system in accordance with another embodiment.

FIG. 15 is a plan view of a sailboat with a retractable solar panel system 500, which is attached to a telescoping or retractable mast 550. As shown in FIG. 15, the retractable solar panel system 500 includes a plurality of solar panels 510 attached to one another and attached to a fixed stay 502, which is attached at one end 504 to the hull of the sailboat at the other end 506 to an upper end 572 of a telescoping or retractable mast 550. The telescoping or retractable mast 550 is comprised of a plurality of tubular sections 552, 554, 556, 558, 560 that slid inside each other for easier storage when not being used. The telescoping mast 550 can be lengthen and shorten as desired. It can be appreciated that the tubular sections 552, 554, 556, 558, 560 can have any suitable cross-sectional design, which accommodates a telescoping design, including rectangular and/or square. A handle or mechanical winch system 580 can be used to raise and lower the mast 550.

The panel system 500 includes a pair of solar panels 522, 524 having a hinge 526, 528 between to allow the plurality of panels 510 to be stacked when not in use. It can be appreciated that the use of the solar panel system 500 and telescoping and/or retractable mast 550 is not limited to sailboats 10, and that the solar panel system 500 and telescoping and/or retractable mast 550 can be placed on any suitable structure including residential and commercial buildings, windmills, water towers, billboards, support structures such as bridges, radio masts, antennas, and towers, and natural landforms, including hills, cliffs, fields, berms, mounds and valleys.

Figure 16:
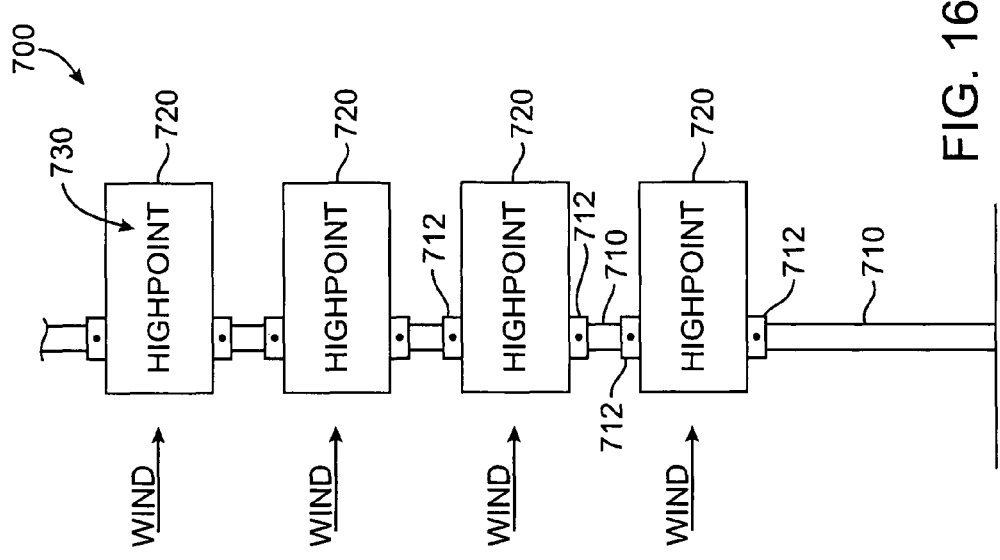
FIG. 16 is a plan view of a solar panel system in accordance with a further embodiment.

FIG. 16 is a plan view of a solar panel system 700 in accordance with a further embodiment. As shown in FIG. 16, the solar panel system 700 is comprised of a plurality of solar panels 720, which are attached to a support member 710, in the form of a pole or tubular member. In accordance with one embodiment, the plurality of solar panels 720 is rotatable, such that the solar panels 720 will lie in the same plane as the wind blows. The rotatable solar panels 720 provide the solar panel system 700 with the ability to be placed in areas of high winds without requiring the face 730 of the solar panels 720 to be positioned directly into the wind. Rather the solar panels 720 rotate such that the main face 730 of the solar panel lies in the same direct as the wind blows. If the direction of the wind changes, the solar panels 720 rotate, such that the face 730 of the solar panel 720 is always in the same plane as the direction of the wind.

In accordance with one embodiment, the solar panels 720 can be attached to the support member 710 by any suitable means, which allows the solar panels 720 to rotate. For example, as shown in FIG. 16, the solar panels 720 can be attached to the support member 710 with a coupling member 712, which rotates around the support member 710. The solar panels 720 can also include indicia, such as "HIGHPOINT" or other trade names for advertising or marketing purposes.

Figure 17:
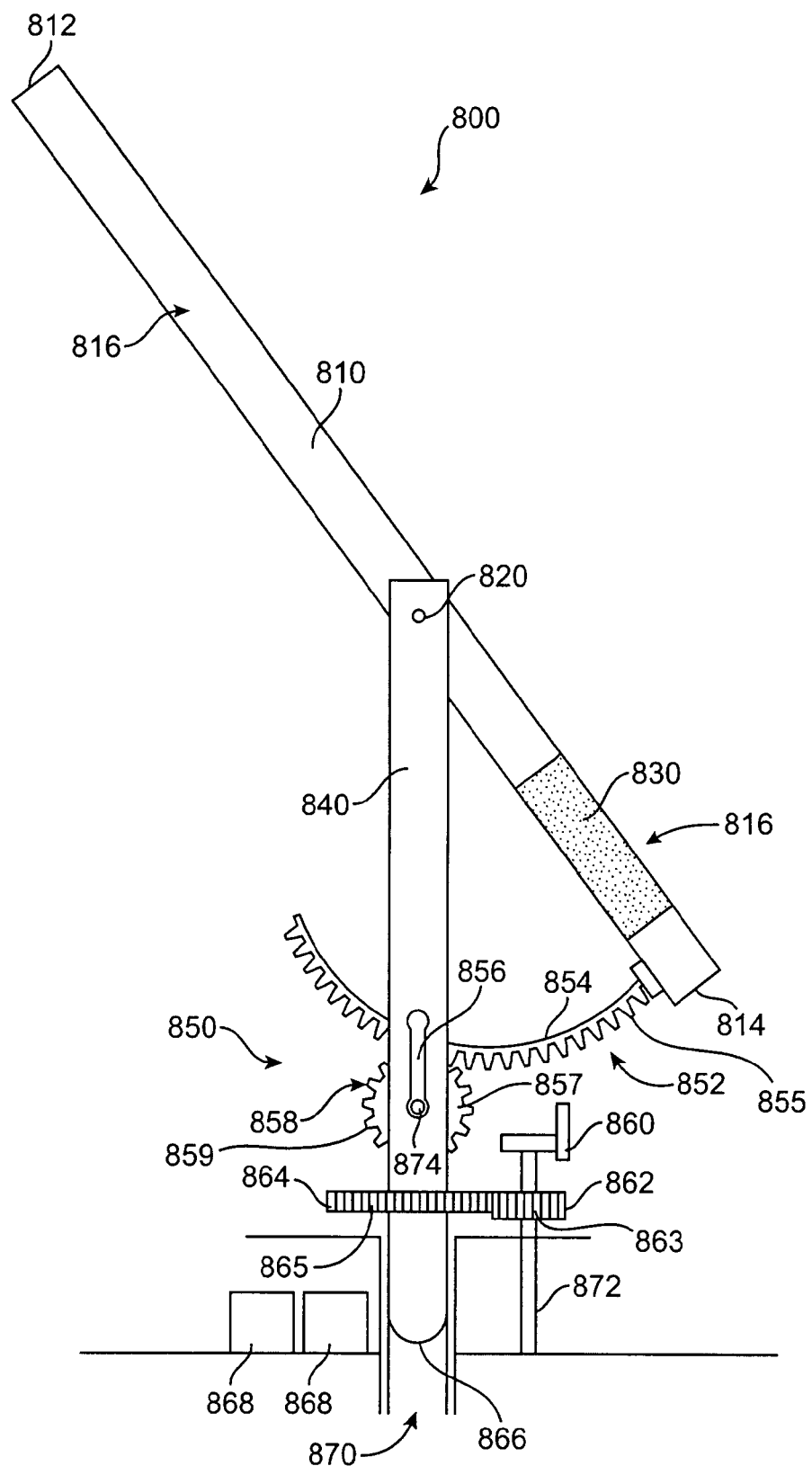
FIG. 17 is a plan view of a solar system for adjusting a retractable solar system in accordance with one embodiment.

FIG. 17 is a plan view of adjustable solar system 800 in accordance with an embodiment. As shown in FIG. 17, the system 800 includes an upper support member 810 and a lower support member 840, which are pivotally attached to one another at a pivot point 820. The pivot point 820 acts as a pivot point for the upper and the lower support members 810, 840, such that the relative angle and position of the upper support member 810 can be adjusted and/or altered so that the plurality of solar panels 910 (FIG. 18) can face the sun during the various seasonal changes, wherein the relative position of the sun in the sky varies during the year.

As shown in FIG. 17, the support member 810 extends from an upper end 812 to a lower end 814. In accordance with an embodiment, the upper support member 810 includes an upper portion 816 and a lower portion 818, wherein the lower portion 818 includes a counter weight 830, which assists with the movement of the upper and lower support members 810, 840 during directional and angular changes to the upper and lower support member 810, 840. The counter weight 830 is preferably incorporated within the lower portion 818 of the upper support member 810. However, it can be appreciated that the counter weight 830 can be external to the upper support member 810.

The upper support member and the lower support member 810, 840 preferably have a rectangular cross-section, however, it can be appreciated that the support members 810, 840 can have a triangular, a circular, an elliptical or other suitable cross-sections. In addition, it can be appreciated that the upper and lower support members 810, 840 can be made of any suitable material, including but not limited to wood, steel, plastic or other suitable composite materials.

The system 800 also includes a gear assembly 850 comprised of an upper assembly 852 having a portion of a circular member 854 with a plurality of teeth 855, which engages an upper wheel assembly 858. The upper wheel assembly 858 has a circular base member 857 with a plurality of teeth 859. As shown in FIG. 17, the plurality of teeth 859 of the upper wheel assembly 858 are configured to engage the teeth 855 of the upper assembly 852 to adjust the angle of the upper support member 810 relative to the base of the system 800. The upper wheel assembly 858 also includes a handle 856, which is attached via a shaft 874. The handle 856 is configured to rotate either clockwise and/or counterclockwise to raise and lower the upper end 812 of the upper support member 810, which results in a relative change in the angle of the upper support member 810.

The gear assembly 850 also includes a pair of lower wheel assemblies 862, 864, each of which includes a plurality of teeth 863, 865, which are configured to engage one another. The lower wheel assemblies 862, 864 also include a shaft 872 attached to a handle 860. The rotation of the handle 860 in a clockwise and/or counterclockwise manner results in the rotation of the lower support member 840 around an axis (or central point) from 10 to 360 degrees, such that the system 800 can be adjustable for the different seasons and the relative positions of the sun in the sky during the year.

In accordance with one embodiment, the base 866 of the lower support member 840 is preferably positioned within a bearing system 870, which permits constrained relative motion between the base unit and the base 866 of the lower support member 840. It can be appreciated, that any suitable system 870, which allows rotation of the lower support member 840 can be used.

The system 800 also preferably includes at least one storage device 868, which is configured to store energy generated by the solar panels 900. It can be appreciated the at least one storage device 868 is preferably a battery or other suitable storage device, which converts a chemical or other stored energy directly to electrical energy.

It can also be appreciated that the storage devices 868 can also be used to power the gear assembly 850. In accordance with an embodiment, the system 800 can include sensors (not shown), which are connected to a computer or other suitable computing device having a printed circuit board, a microprocessor or a central processing unit (CPU), wherein based on the readings from the sensor or other relevant data stored within or on the printed circuit board, the microprocessor or the central processing unit, such that the system 800 rotates and/or adjust the relative position of the solar panel system 900 to address the sun at a desired angle of reception.

In accordance with one embodiment, the system 800 can include a table of the altitude and azimuth of the sun during a specific period of time and/or day, and upon certain desired parameters, the system 800 can be programmed to change the relative positions of the upper and lower support members 810, 840 to compensate for the changing positions of the sun. It can be appreciated that in accordance with a preferred embodiment, the solar panels 910 (FIG. 18) are preferably facing the sun for an optimum or desired period of time.

It can also be appreciated that the system 800 is preferably self-powered, to adjust the upper and lower support members 810, 840 and solar panel system 900 and solar panels relative to the sun during the various seasons and relative positions of the sun in the sky during such change of seasons. It can be also be appreciated that the system 800 can include other sources of power to adjust the upper and lower support members 810, 840, including electrical, hydraulic or other suitable power sources.

Figure 18:
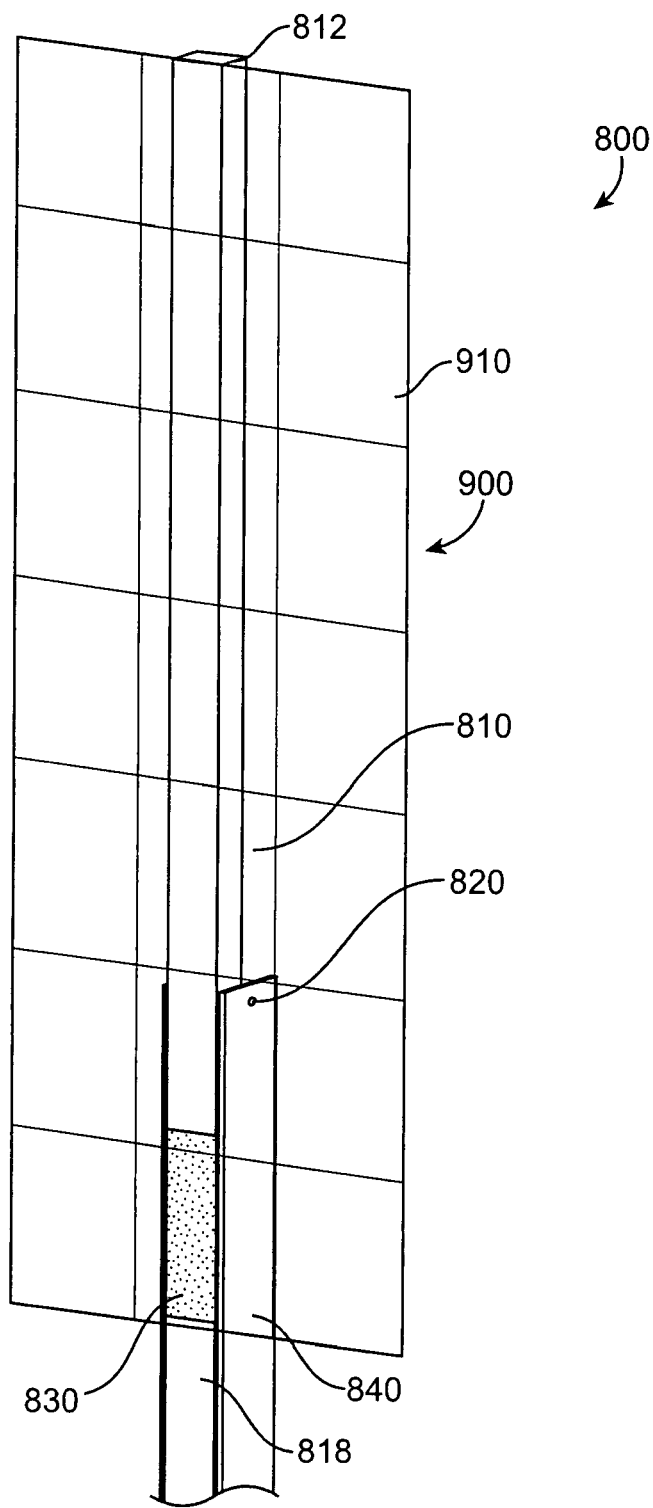
FIG. 18 is a perspective view of a portion of the system of FIG. 17 having a plurality of solar panels.

FIG. 18 is a perspective view of a portion of a solar panel system 900 comprised of an adjustable solar system 800 and a plurality of solar panels 910. As shown in FIG. 18, the solar panel system 900 includes a plurality of solar panels 910, which can include photovoltaic cells (such as a photovoltaic module comprised of a packaged interconnected assembly of photovoltaic cells), solar thermal collector panels, solar hot water panels or other solar panels, which convert sun light and/or the heat from the sun into an energy source, which can either be stored and/or used to power a system attached to the system 900.

In accordance with an embodiment, the solar panels 910 are attached to a surface, which is configured to face the sun, of the upper support member 810. The upper support member 810 can be permanently fixed to plurality of solar panels 910, or attachable in a manner in which the solar panels 910 can be removed or interchanged with a snap fit or other means of removal and/or replacement of the plurality of solar panels 910.

The solar panels 910 are preferably attached in module or arrays of solar panels 910, if individual solar panels 910 are used or in an alternative embodiment, a single roll of solar panels 910 can be used. Although a single adjustable solar system 800 and solar panel system 900 are shown in FIGS. 17 and 18, it can be appreciated that the systems 800, 900 are designed to be modular, such that a plurality of systems 800, 900 can be used to accommodate large areas, which can accommodate a plurality of systems 800, 900 such as fields or large buildings.

In accordance with one embodiment, the solar panels 910 can include a plurality of photovoltaic modules or as known, a photovoltaic array. The installation of the photovoltaic cells will preferably include an array of photovoltaic modules, connected electrically, and include an inverter (for grid connected arrays) or batteries (for off grid).

In accordance with one embodiment, the photovoltaic arrays or solar panels 910 can be constructed from a rigid thin film. In a rigid thin film module, the cells are preferably created directly on a glass substrate or superstrate, and the electrical connections are created in situ, forming a monolithic integration. The substrate or superstrate is laminated with an encapsulant to a front or back sheet. In an alternative embodiment, the photovoltaic array can be comprised of flexible thin film cells are created by depositing the photoactive layer and other necessary layers on a flexible substrate.

Alternatively, the solar panel system 900 and solar panels 910 can be comprised of a solar thermal collector is a solar collector specifically intended to collect heat and/or absorb sunlight to provide heat, including solar parabolic, solar trough and solar towers. In accordance with one embodiment, solar collectors can be used in a solar power plant where solar heat is used to generate electricity by heating water to produce steam and driving a turbine connected to the electrical generator.

In another embodiment, the solar panel system 900 and solar panels 910 can be comprised of a plurality of solar hot water panels, which uses the sun's energy to heat a fluid, which is used to transfer the heat to a heat storage vessel. For example, in accordance with one embodiment, potable water would be heated and then stored in a hot water tank on a sailboat. Solar hot water panels typically include a flat-plate solar-thermal collector, which includes an absorber plate to which fluid circulation tubes are attached. The absorber, usually coated with a dark selective surface, assures the conversion of the sun's radiation into heat, while fluid circulating through the tubes carries the heat away where it can be used or stored. The heated fluid is pumped to a heat exchanger, which is a coil in the storage vessel or an external heat exchanger where it gives off its heat and is then circulated back to the panel to be reheated. Fluid circulation can be assisted by means of a mechanical pump (which itself could be powered by photovoltaic cell), or (where mounting conditions allow) by allowing convection to circulate the fluid to the storage vessel mounted higher in the circuit.

Figure 19:
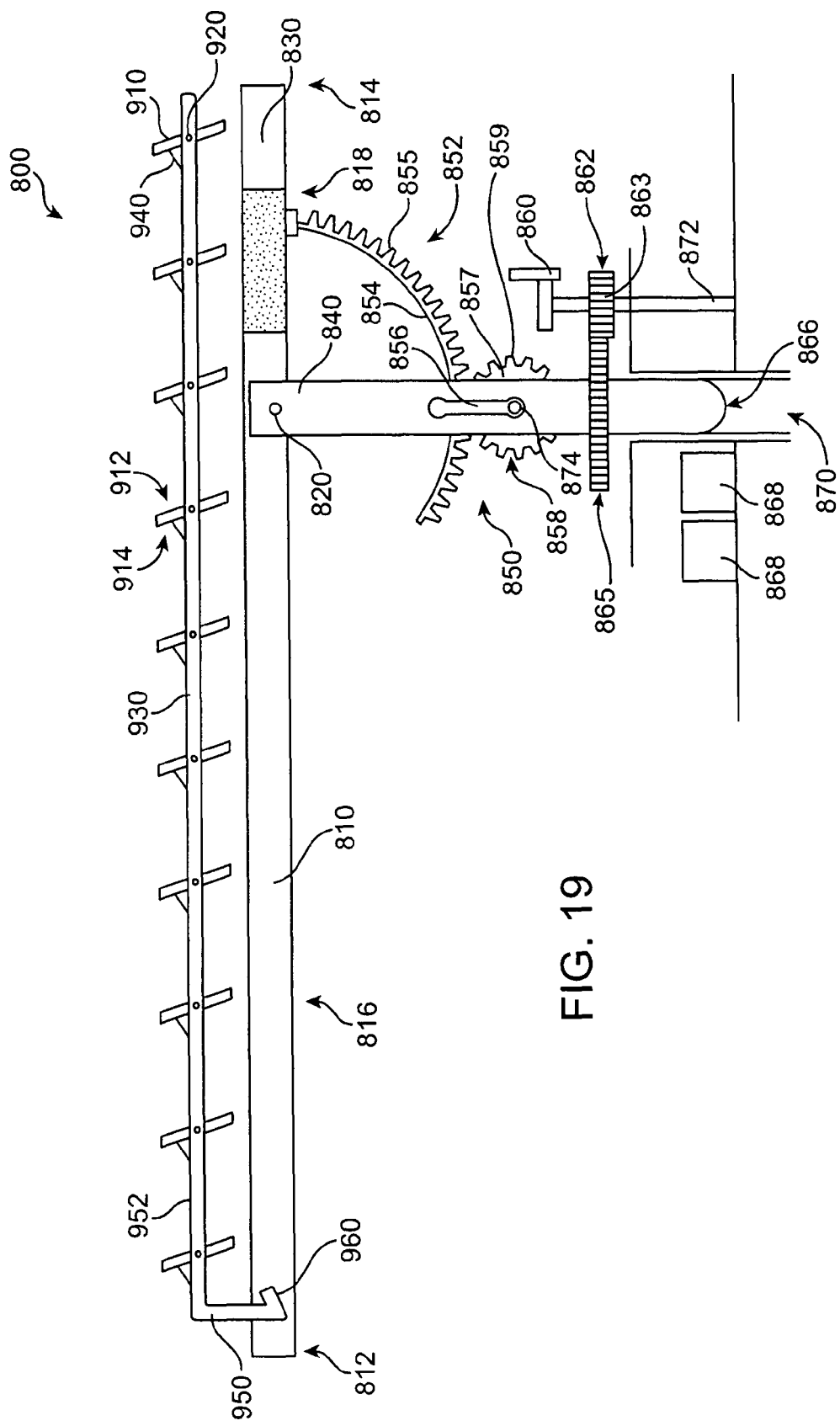
FIG. 19 is a plan view of a solar system for adjusting a plurality of solar panels in accordance with another embodiment.

FIG. 19 is a plan view of a solar system 800 for adjusting a plurality of solar panels 910 in accordance with another embodiment. As shown in FIG. 19, the solar system 800 includes an upper support member 810, which is attached to a lower support member 840. The solar system 800 also includes a gear assembly 850 comprised of an upper assembly 852 having a portion of a circular member 854 with a plurality of teeth 855, which engages an upper wheel assembly 858 having a circular base member 857 with a plurality of teeth 859. The plurality of teeth 859 on the upper wheel assembly 858 engages the teeth 855 to raise and lower the upper support member 810. The upper wheel assembly 858 also includes a handle 856, which is attached via a shaft 874.

In accordance with one embodiment, the solar panels 910 include a plurality of solar panels 910 having a front side 912 and a back side 914. Each of the individual solar panels 910 are preferably attached to a rod 940, which is configured to adjust the relative position of the front side 912 (and back side 914) of the solar panels 910 relative to the position of the sun in the horizon during the various seasons. The rod 940 is preferably attached to an exterior handle or lever 960, which adjusts the relative positions of the solar panels 910 to the sun, or alternatively an internal switch or lever (not shown) which is attached to a printed circuit board or other suitable microprocessor. The printed circuit board and/or microprocessor can be manually operated to change the relative positions of the solar panels 910 or alternatively, the printed circuit board and/or microprocessor can be programmed for the various positions of the sun during the changing seasons.

In accordance with one embodiment, the solar panels 910 are attached to a solar panel member 930 which includes a pair of support members 950, 952. The solar panel member 930 and preferably extend from the upper end 812 to the lower end 814 of the upper support member 810. The solar panel member 930 includes an upper solar portion 952, wherein the solar panels 910 are attached thereto, and an angled portion 950 at the upper end 812 of the upper support member 810. During use, the solar panels 910 can be adjusted by moving the rod 940 via the handle or lever 960 or an internal switch or lever (not shown).

The system also includes a pair of lower wheel assemblies 862, 864, each of which includes a plurality of teeth 863, 865, which are configured to engage one another. The lower wheel assemblies 862, 864 also include a shaft 872 attached to a handle 860. The rotation of the handle 860 in a clockwise and/or counterclockwise manner results in the rotation of the lower support member 840 around a 360 degree axis, such that the system 800 can be adjustable for the different seasons and the relative positions of the sun in the sky.

In accordance with one embodiment, the base 866 of the lower support member 840 is preferably positioned within a bearing system 870, which permits constrained relative motion between the base unit and the base 866 of the lower support member 840. It can be appreciated, that any suitable system 870, which allows rotation of the lower support member 840 around an axis can be used. In accordance with one embodiment, the lower support member 840 preferably rotates around an axis from about 10 to 360 degrees.

The system 800 also preferably includes at least one storage device 868, which is configured to store energy generated by the solar panels 900. It can be appreciated the at least one storage device 868 is preferably a battery or other suitable storage device, which converts a chemical or other stored energy directly to electrical energy.

FIG. 20 is a plan view of a solar panel unit 1000 for an adjustable solar system 800, which can be attached to a roof or other structure. The solar panel unit 1000 includes a solar panel support 1010 and a pair of optional panel support members 1020, 1030. The solar panel support member 1010 is preferably attached to a base unit 1040 having a rectangular perimeter having a generally "A" shaped perimeter support. The base unit 1040 includes an inner base 1042, a pair of diagonal members 1044, 1046, which extend upward to form a generally inverse "V", an outer base 1048, and a support member 1050. The support member 1050 is preferably located in the generally central portion of the pair of diagonal members 1044, 1046.

In accordance with one embodiment, the solar panel support member 1010 is interchangeable with the lower support member 840 of the adjustable solar system 800. In addition, the optional support members 1020, 1030 can house the gear assembly 850 as shown in FIGS. 17 and 19.

It can be appreciated that any of the solar panel systems, 500, 600, 700, 800, and 900 can be attached to any suitable structure on corners and/or edges of the structure with suitable connectors. For example, in accordance with one embodiment, the adjustable solar system 800 as shown in FIGS. 17 and 19 can be attached to a corner of a building or structure such that the solar panels 910 extend over the roof of the building and/or structure and run parallel or generally in the same direction as the sides of the building or structure.

In accordance with another embodiment, the solar panel systems 500, 600, 700, 800, 900 can be sold as kits comprised of a plurality of solar panels 510, 610, 720, 910 with a system for extending and retracting the plurality of solar panels 510, 610, 720 or an adjustable solar system 800 with or without a solar panel unit 1000. It can be appreciated that the kits are preferably modular in nature, and that a plurality of individual kits can be combined to provide a plurality of solar panel systems 500, 600, 700, 800, 900 for larger areas. The kits also preferably include at least one storage device 668 and any necessary electrical connectors and cables or wires.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A retractable solar panel system comprising:
   a plurality of solar panels, and wherein the plurality of solar panels are in pairs which are connected to one another via a hinge; and
   a system for extending and retracting each of the pairs of solar panels, such that the plurality of solar panels are retracted into a stack when not in use.

2. The system of claim 1, wherein the plurality of solar panels are attached to a nautical stay of a sailboat, and the stay is fixed at one end to a hull of the sailboat and at a second end to a mast of the sailboat.

3. The system of claim 2, wherein the mast is a telescoping mast.

4. The system of claim 1, wherein the system for extending and retracting the plurality of solar panels is a winch.

5. The system of claim 1, wherein each solar panel includes at least one photovoltaic panel.

6. The system of claim 1, wherein the plurality of solar panels are stored in a z-fold stack when not in use.

7. The system of claim 1, further comprising at least one edge member, which assists with the alignment of the solar panels during use.

8. The system of claim 2, wherein for each pair of solar panels, an upper edge of one of the solar panels and a lower edge of the other solar panel is attached to the nautical stay of the sailboat.

9. The system of claim 7, wherein the at least one edge member is at least one wire, which is attached to at least one outer edge of the plurality of solar panels.

10. The system of claim 7, wherein the at least one edge member is a clip, which attaches an outer edge of each of the solar panels to one another.

11. The system of claim 5, wherein each of the photovoltaic panels is comprised of an assembly of solar cells used to generate electricity.

12. A retractable solar panel system comprising:
a plurality of solar panels, and wherein the plurality of solar panels are in pairs which are connected to one another via a hinge; and
a system for extending and retracting the plurality of solar panels, and wherein the plurality of solar panels is retracted into a z-fold stack when not in use.

13. The system of claim 12, wherein the plurality of solar panels are attached to a nautical stay of a sailboat, and the stay is fixed at one end to a hull of the sailboat and at a second end to a mast of the sailboat.

14. The system of claim 13, wherein the mast is a telescoping mast.

15. The system of claim 12, wherein each of the plurality of solar panels includes at least one photovoltaic panel.

16. The system of claim 12, wherein the plurality of solar panels are attached to each other via a hinge to allow the solar panels to be stacked when not in use.

17. The system of claim 12, wherein each of the plurality of solar panels is generally flat.

18. The system of claim 12, wherein each of the plurality of solar panels is generally rectangular in shape.

* * * * *